United States Patent [19]

Wu

[11] Patent Number: 5,464,238
[45] Date of Patent: Nov. 7, 1995

[54] ANGLE-ADJUSTABLE FOLDING FRAME ASSEMBLY FOR A GOLF CART

[76] Inventor: Ching-Chang Wu, No. 35-1, Jih Hsin Street, Tu Cheng Hsiang, Teipei Hsien, Taiwan

[21] Appl. No.: 251,217

[22] Filed: May 31, 1994

[51] Int. Cl.⁶ ..................................................... B62B 1/12
[52] U.S. Cl. ........................... 280/42; 280/646; 280/655; 280/DIG. 6; 280/47.315
[58] Field of Search .............................. 280/DIG. 6, 646, 280/652, 654, 655, 47.26, 47.315, 42

[56] References Cited

U.S. PATENT DOCUMENTS

| | | | |
|---|---|---|---|
| 2,518,803 | 10/1945 | Marvin | 280/47.26 |
| 3,081,108 | 5/1962 | Vogt | 280/DIG. 6 |
| 4,832,362 | 5/1989 | Chen | 280/DIG. 6 |
| 4,913,460 | 4/1990 | Klein | 280/646 |
| 5,143,399 | 9/1992 | Liu | 280/652 |
| 5,180,087 | 1/1993 | Lee | 280/646 |
| 5,249,822 | 10/1993 | Wu | 280/47.315 |
| 5,281,044 | 1/1994 | Chen | 280/DIG. 6 |

*Primary Examiner*—Margaret A. Focarino
*Assistant Examiner*—Min S. Yu
*Attorney, Agent, or Firm*—Varndell Legal Group

[57] ABSTRACT

An angle-adjustable folding frame assembly for a golf cart, which includes a handle having a handle connector at one end pivoted to the handle bracket and wheel bracket on the main frame of a golf cart, a first locating member made to slide on the handle and having a positioning rod, a slide block connected to the first locating member and moved to slide on the handle connector, a spring stopped between the handle connector and the first locating member, and a second locating member affixed to the front end of the main frame and having two spaced retaining grooves for alternatively receiving the positioning rod of the first locating member in holding the handle in a first or second working position.

1 Claim, 6 Drawing Sheets

5,464,238

ANGLE-ADJUSTABLE FOLDING FRAME ASSEMBLY FOR A GOLF CART

BACKGROUND AND SUMMARY OF THE INVENTION

The present invention relates to golf carts, and more particularly to an angle-adjustable folding frame assembly for a golf cart.

The frame assemblies of golf carts are commonly made folding collapsible so that golf carts can be collapsed to reduce their storage space when not in use. Furthermore, the handle of the frame assembly of a golf cart may be made telescopic for fitting users of different heights. However, simply shortening the handle cannot change the angle of the body the golf cart relative to the handle. Therefore, an angle adjusting device must be installed and connected between the handle and the main frame of the golf cart. However, an angle adjusting device for this purpose is expensive and inconvenient to operate.

The present invention has been accomplished to provide an angle-adjustable folding frame assembly for a golf cart which eliminates the aforesaid problems. According to the present invention, the angle-adjustable folding frame assembly comprises a handle having a handle connector at one end pivoted to the handle bracket and wheel bracket on the main frame of a golf cart, a first locating member made to slide on the handle and having two positioning rods, a slide block connected to the first locating member and moved to slide on the handle connector, a spring stopped between the handle connector and the first locating member, and a second locating member affixed to the front end of the main frame and having two spaced retaining grooves for alternatively receiving the positioning rods of the first locating member in holding the handle in a first or second working position. Simply pushing the first locating member toward the handle connector, the positioning rods are released from the second locating member, and therefore the handle can be turned to the collapsed position. When the handle is turned from the collapsed position toward the second locating member, the positioning rods will be guided by the curved guide grooves on the second locating member into either retaining groove.

DETAILED DESCRIPTION OF THE PREFERRED EMBODIMENT

Figure 1:
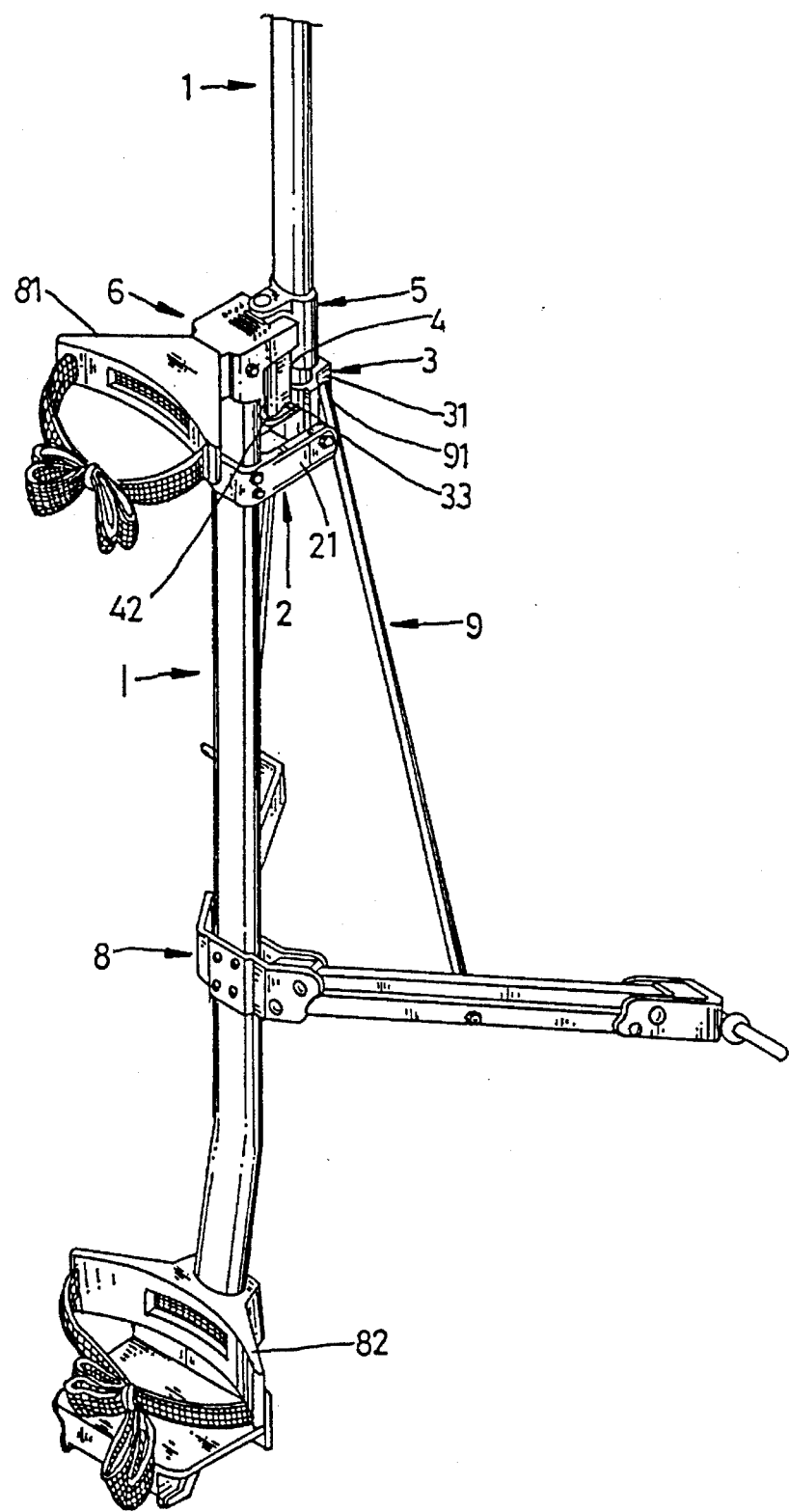
FIG. 1 is an elevational view of a golf cart showing the installation of the present invention.
Figure 2:
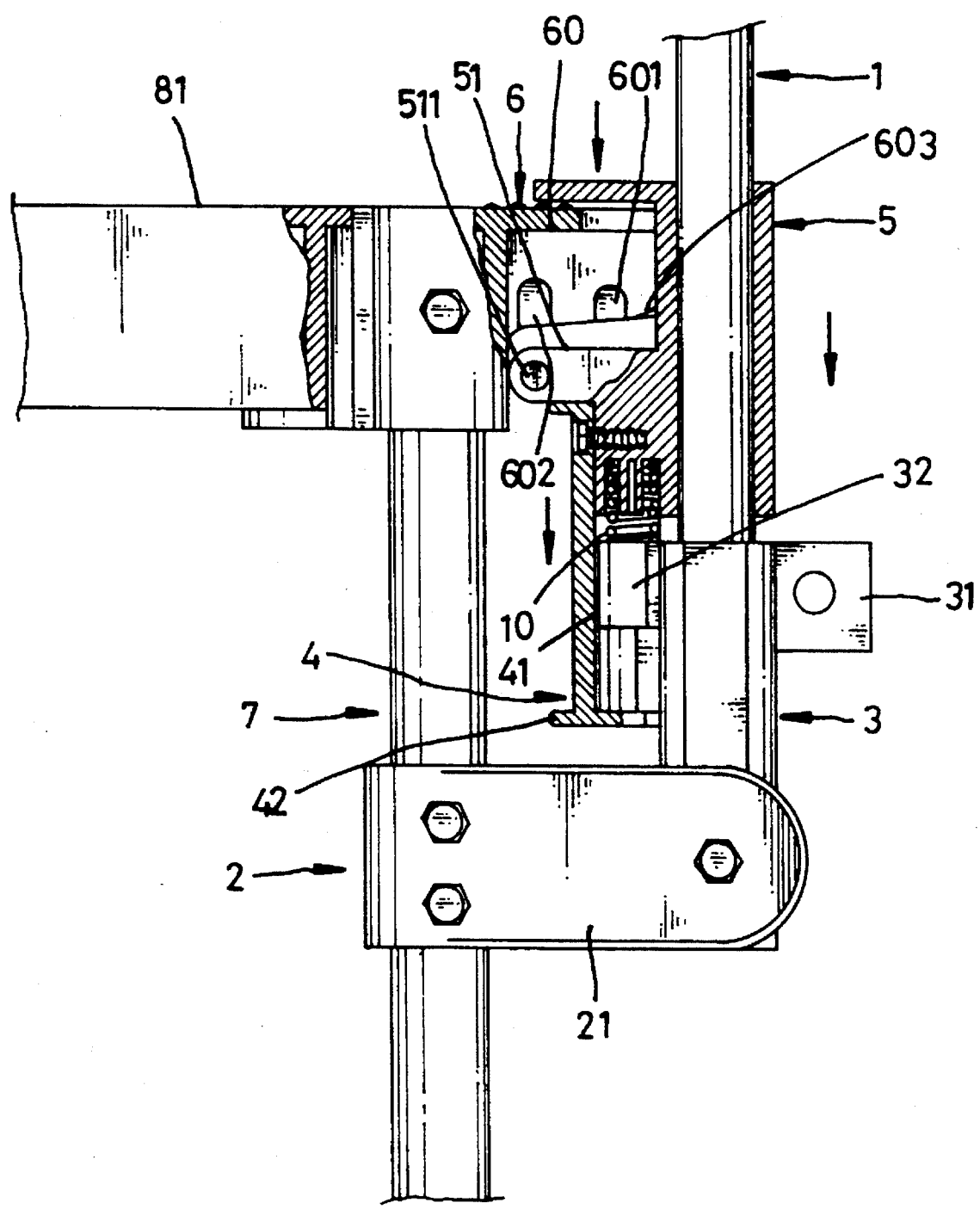
FIG. 2 is a sectional view of the first and second locating members of the present invention, showing the moving direction of the first locating member relative to the second locating member.

Referring to FIGS. 1 through 7, an angle-adjustable folding frame assembly for a golf cart in accordance with the preferred embodiment of the present invention is generally comprised of a handle 1, a handle bracket 2, a handle connector 3, a slide block 4, a first locating member 5, a second locating member 6, a main frame 7, a wheel bracket 8, a first bag cradle 81, a second bag cradle 82, two links 9, and a spring 10.

The handle bracket 2 is affixed to the main frame 7 at a suitable location, having two parallel side walls 21 for pivotally connecting the handle 1 by the handle connector 3.

The handle connector 3 has a front end affixed to the rear end of the handle 1, a rear end pivoted to the two opposite side walls 21 of the handle bracket 2, two parallel lugs 31 at one side, to which one end 91 of either link 9 is pivotally connected, a longitudinal rail 32 at an opposite side inserted into a longitudinal sliding groove 41 on the slide block 4 for permitting the slide block 4 to be moved thereon in the longitudinal direction, a hole 321 on the rail 32, which receives one end 101 of the spring 10, a raised block 33 stopped against an end flange 42 of the slide block 4 to limit the moving range of the slide block 4.

The slide block 4 has one end affixed to a block 52 on the first locating member 5, an opposite end terminating in an outward end flange 42 stopped against the raised block 33 of the handle connector 3, and a longitudinal sliding groove 41 mounted on the longitudinal rail 32 of the handle connector 3.

The spring 10 has one end 101 received in the hole 321 on the longitudinal rail 32 of the handle connector 3, and an opposite end 102 received in a hole 521 on the block 52 of the first locating member 5.

The first locating member 5 is mounted around the handle 1 near the handle connector 3, having a block 52 connected to the slide block 4, a positioning rod 511 raised from a projecting frame 51 thereof and engaged into the outer retaining groove 601 or the inner retaining groove 602 on the shell 60 of the second locating member 6 at two opposite sides.

The second locating member 6 is affixed to the front end of the main frame 7, having two retaining grooves 601; 602 on the shell 60 thereof at two opposite sides, which receive the positioning rod 511 of the first locating member 5 respectively, two curved guide surfaces 603 on two opposite sides of the shell 60 for guiding the positioning rod 511 of the first locating member 5 into the retaining groove 601 or 602. When the positioning rod 511 of the first locating member 5 is engaged into the inner retaining groove 602 of the second locating member 6, the handle 1 and the main frame 7 are connected in line. When the positioning rod 511 of the first locating member 5 is engaged into the outer retaining groove 601, the handle 1 is connected to the main frame 7 at a certain angle.

Figure 3:
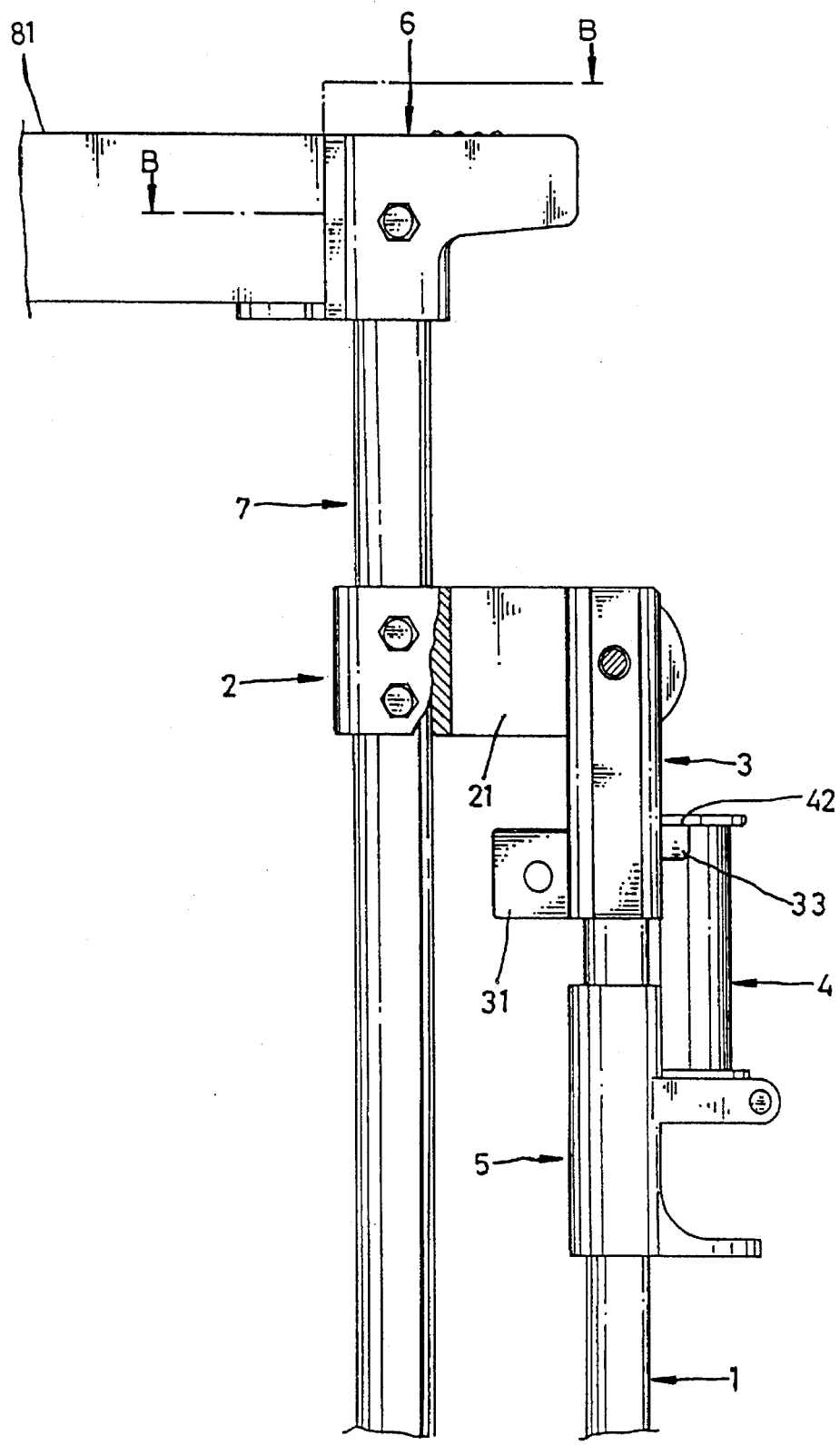
FIG. 3 shows the handle of the present invention collapsed.

Referring to FIG. 3 and FIG. 2 again, when the first locating member 5 is pushed backwards toward the handle bracket 2, the positioning rod 511 is released from the second locating member 6, and therefore the handle 1 can be turned backwards into the collapsed position as shown in FIG. 3 (because the handle connector 3 is pivoted to the handle bracket 2).

Figure 4:
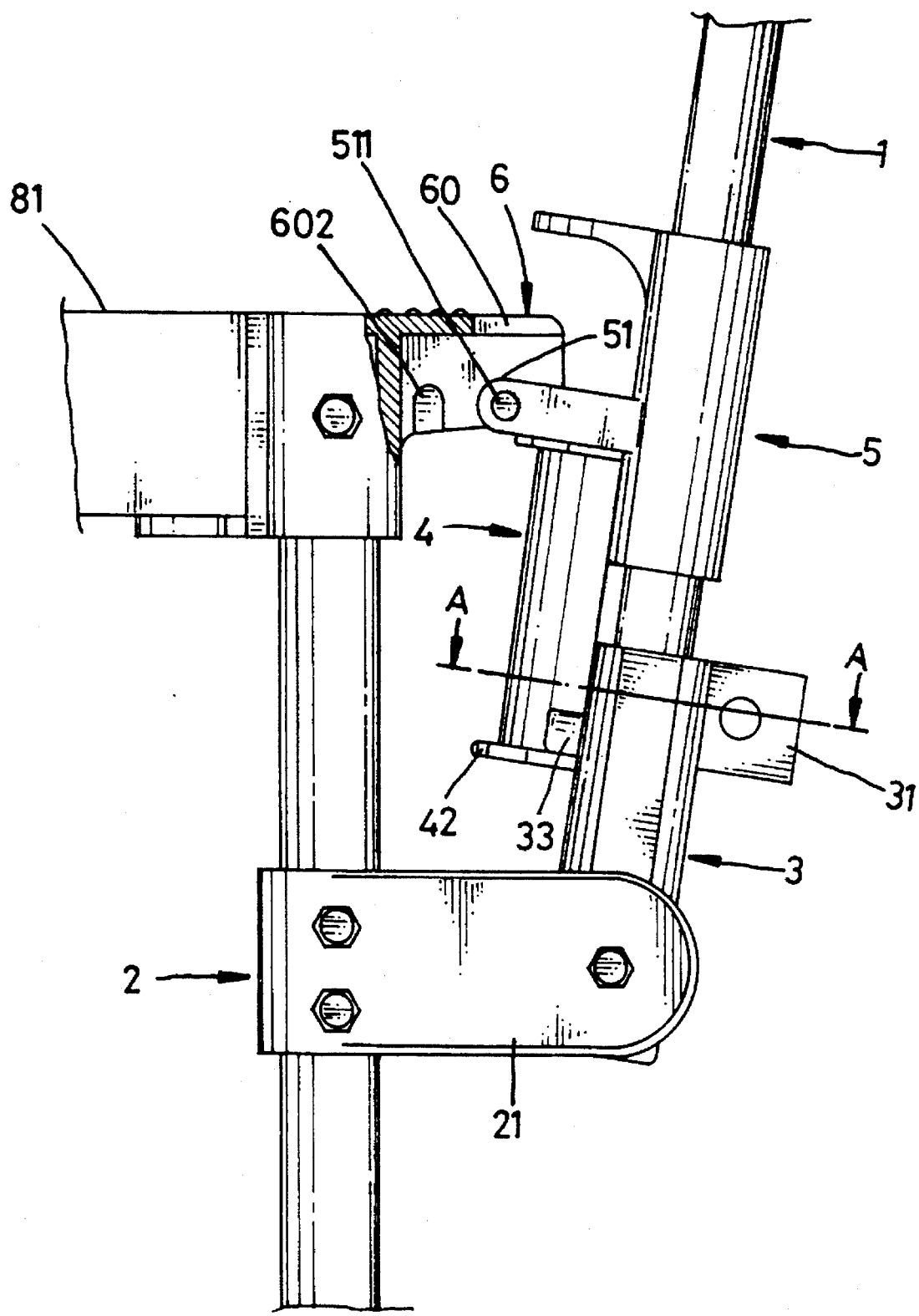
FIG. 4 shows the handle of the present invention secured in the first working position.

Referring to FIG. 4 and FIG. 3 again, when the handle 1 is turned outwards from the collapsed position toward the second locating member 6, the positioning rod 511 of the first locating member 5 is guided by the curved guide surfaces 603 into the outer retaining groove 601, and therefore the handle 1 is retained in the first working position and extended from the main frame 7 at a fixed angle.

Figure 5:
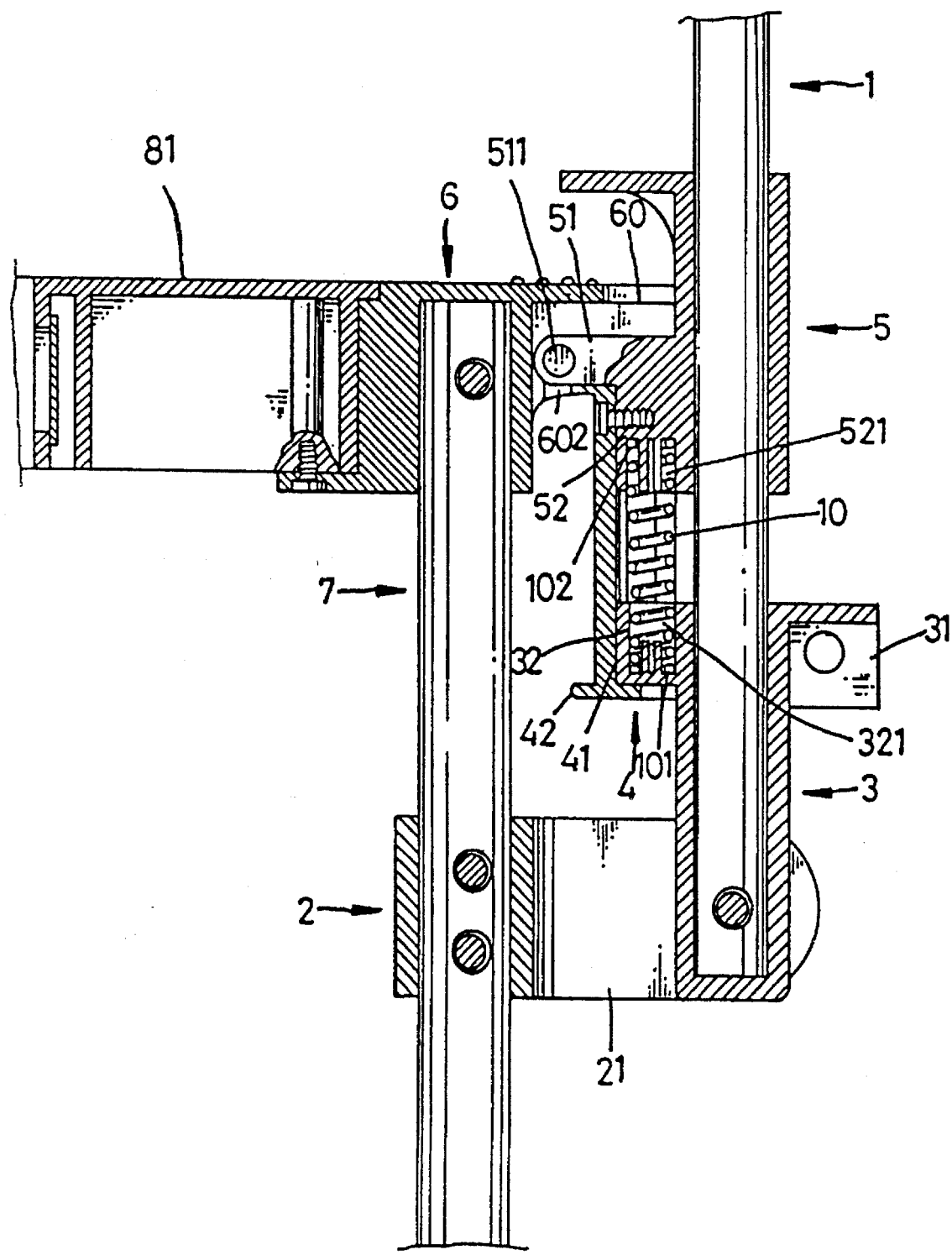
FIG. 5 shows the handle of the present invention secured in the second working position.
Figure 6:
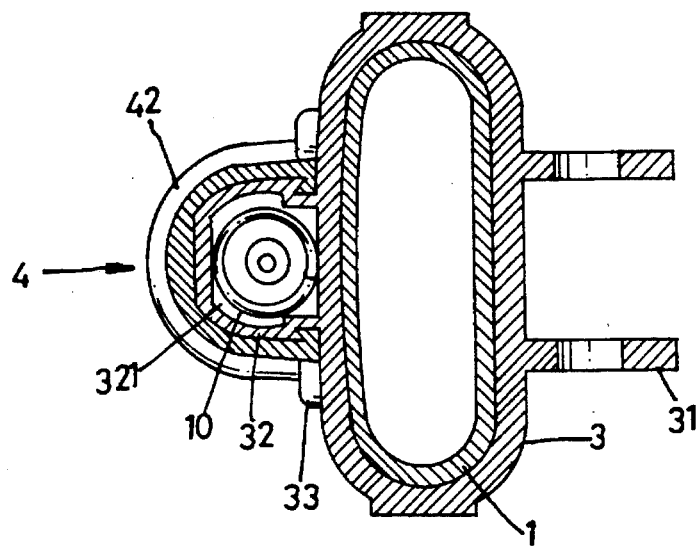
FIG. 6 is a sectional view taken on line A—A of FIG. 4.
Figure 7:
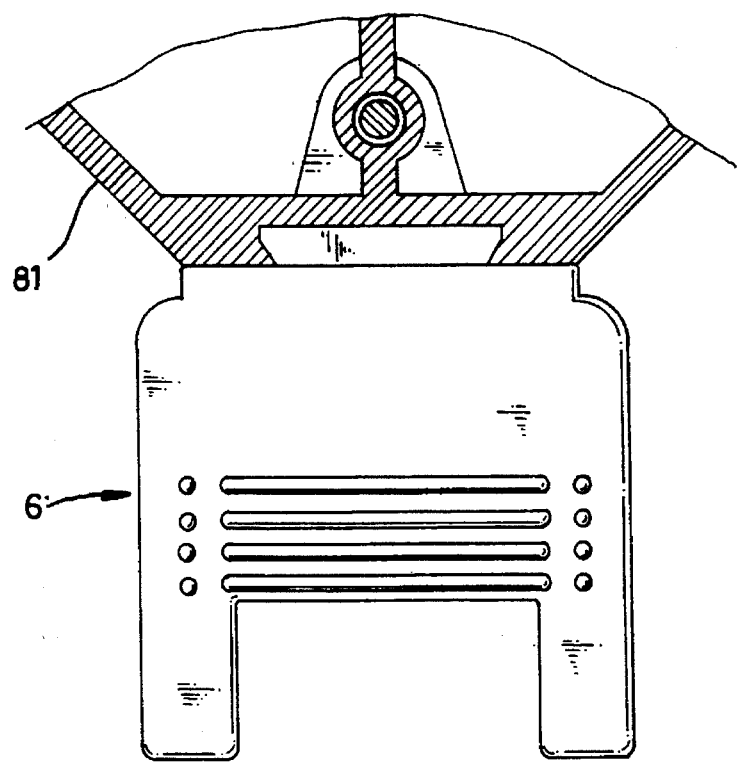
FIG. 7 is a sectional view taken on line B—B of FIG. 4.

Referring to FIG. 5 and FIG. 4 again, when the positioning rod 511 of the first locating member 5 is moved out of the outer retaining groove 601 by force and put into the inner retaining groove 602, the handle 1 becomes retained in the second working position longitudinally aligned with the main frame 7.

I claim:

1. An angle-adjustable folding frame assembly for a golf cart, comprising:

a handle bracket affixed to a main frame of a golf cart having a wheel bracket;

a handle having one end affixed with a handle connector pivoted to said handle bracket, said handle connector having first and second sides, two parallel lugs fixed to said first side respectively pivoted to said wheel bracket of said main frame by a respective link, a longitudinal rail fixed to said second side, and a raised block fixed on said second side and extending outward from said rail;

a first locating member adapted to slide on said handle, said first locating member including a block, said block having a projecting frame extending therefrom and a positioning rod held by said projecting frame;

a spring connection between said block of said first locating member and said rail of said handle connector;

a slide block having first and second ends, said first end affixed to said block of said first locating member, and said second end terminating in a flange releasably held by said raised block of said handle connector, a longitudinal groove receiving said rail of said handle connector and adapted to slide on said rail; and a second locating member affixed to said main frame at a front end thereof for securing said first locating member, said second locating member having an inner retaining groove, an outer retaining groove, and a curved guide surface for guiding said positioning rod of said first locating member into one of said inner and outer retaining grooves;

wherein said handle can be set in a first working position by engaging said positioning rod of said first locating member into said outer retaining groove, a second working position by engaging said positioning rod of said first locating member into said inner retaining groove, and a collapsed position by pushing said first locating member backwards toward said handle connector to release said positioning rod of said first locating member from said second locating member and then turning said handle backwards toward said wheel bracket.

\* \* \* \* \*